(No Model.)
2 Sheets—Sheet 1.
J. H. DAY.
PACKING MACHINE.
No. 592,750.
Patented Oct. 26, 1897.
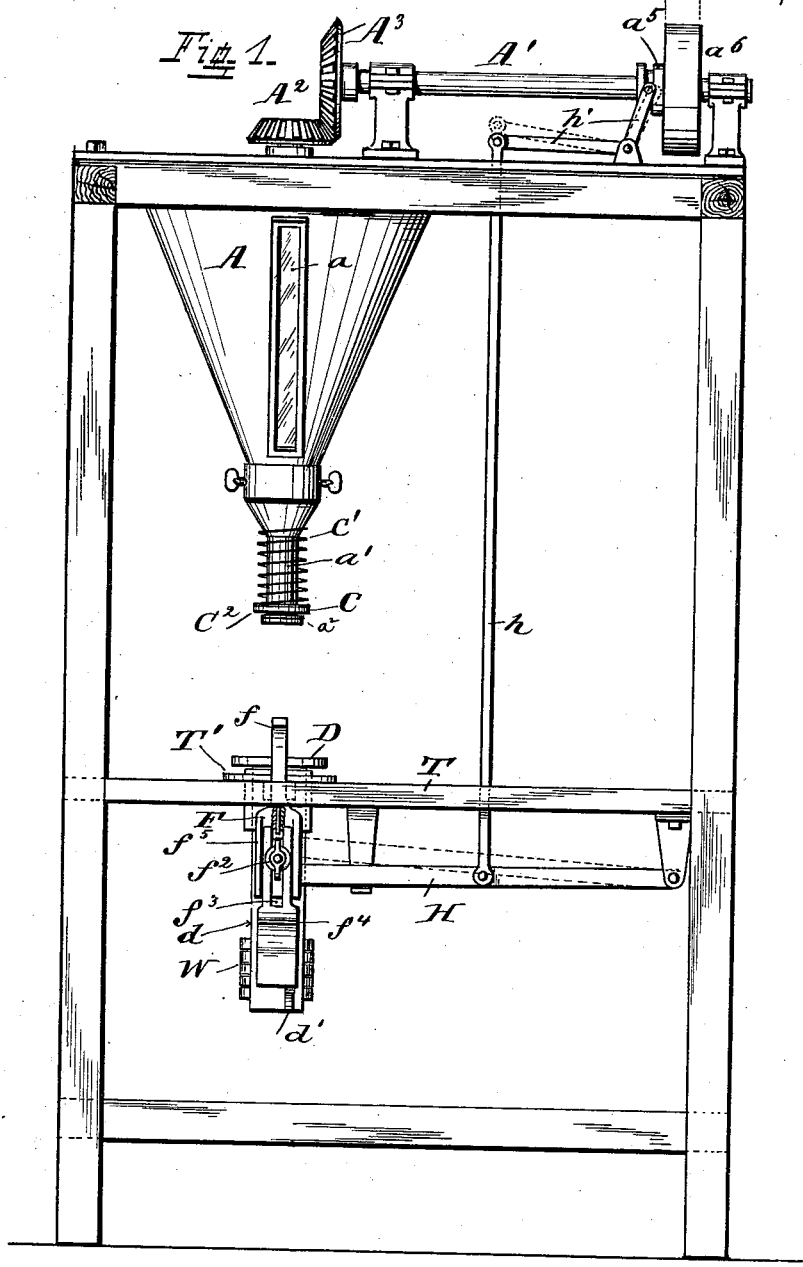
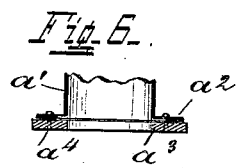
Witnesses
A. Smith
G. H. Paver
Inventor
John H. Day
By his Attorney,
Wm Hubbell Fisher (No Model.) 2 Sheets—Sheet 2.
J. H. DAY.
PACKING MACHINE.
No. 592,750. Patented Oct. 26, 1897.
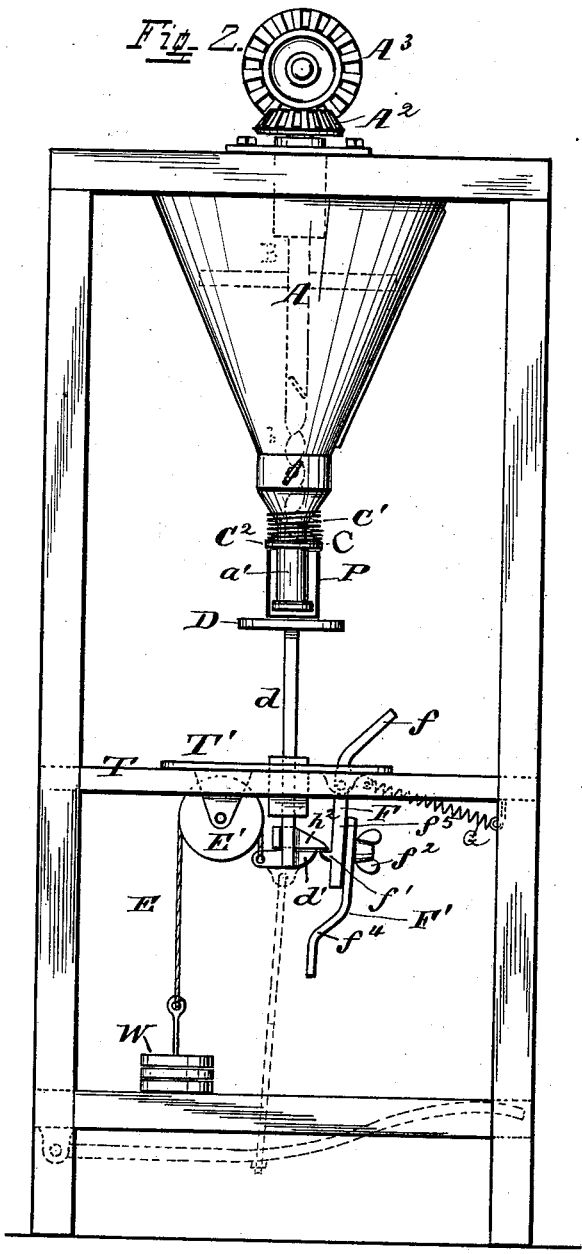
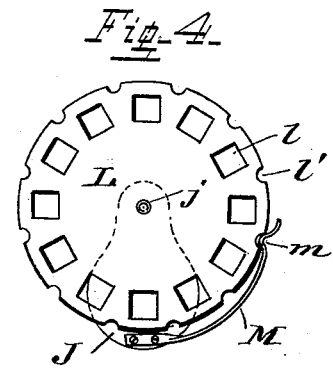
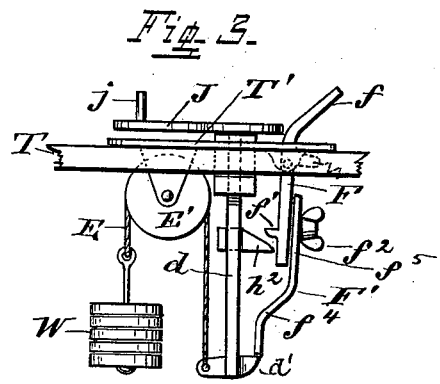
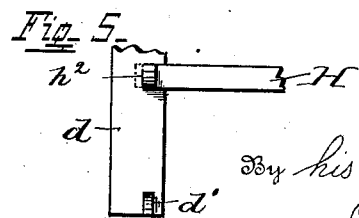
Witnesses
K. Smith
Inventor
John H. Day
By his Attorney
Wm. Hubbell Fisher

UNITED STATES PATENT OFFICE.

JOHN H. DAY, OF CINCINNATI, OHIO.

PACKING-MACHINE.

SPECIFICATION forming part of Letters Patent No. 592,750, dated October 26, 1897.

Application filed December 1, 1888. Serial No. 292,412. (No model.)

*To all whom it may concern:*

Be it known that I, JOHN H. DAY, a citizen of the United States, and a resident of the city of Cincinnati, in the county of Hamilton and State of Ohio, have invented certain new and useful Improvements in Packing-Machines, of which the following is a specification.

The several features of my invention and the advantages arising from their use, conjointly or otherwise, will be apparent from the following description.

In the accompanying drawings, forming part of this specification, Figure 1 is a front elevation of the machine. Fig. 2 is a side elevation of the same. Fig. 3 is a detail view illustrating the position of the parts when the receptacle or receptacles have been filled and the receiving-platform is held down. Fig. 4 illustrates the revolving disk for carrying a number of separate packages. Fig. 5 is a front view of the lever for throwing the clutch and of the lower portion of a vertically-moving stem, showing its mode of throwing the clutch-lever, the view being taken from behind the lever F, hereinafter mentioned, and looking from right to left in Fig. 2. Fig. 6 is a view of the delivery-tube provided with outlying flange and felt secured thereto.

A suitable supporting-frame has at its upper part the hopper A, which is preferably provided with an opening $a$ or an equivalent series of smaller openings covered by a transparent substance to show the state of the contents of the hopper. The hopper A terminates in the spout $a'$.

The shaft B (shown in dotted lines in Fig. 2) passes vertically through the axis of the hopper and terminates in the auger $b$, which occupies the spout $a'$. The shaft B is provided with suitable stirrers located in the hopper. One kind of these stirrers is shown in dotted lines.

The shaft B is operated by the shaft A' through the agency of the beveled gears $A^2$ $A^3$. The shaft A' carries the clutch $a^5$ for throwing the driving-pulley $a^6$ in and out of gear. As shown in Fig. 1, the clutch is out of gear. The spout $a'$ of the hopper A is surrounded by the sliding collar C, which is pressed downward by the spiral spring C'. The under side or edge of this collar C is covered with felt or other soft material.

The lower end of the spout $a'$ is provided with the outlying flange $a^2$. To the lower end of this spout I secure a disk or piece of felt $a^3$ or other soft flexible substance. The flange $a^2$ affords a convenient means of securing the felt to the spout or tube, as shown in Fig. 6. Here the felt is screwed or bolted at $a^4$ to the under side of the flange, the outer peripheral edge of the felt being free to yield and pass within the top portion of the receptacle to be filled, and at the same time its elasticity causes it to press closely against the inner wall or surface of the receptacle and prevent the egress of the substance to be packed during the operation of filling the receptacle. The felt $C^2$ on the lower side of the collar C presses on the top edge of the can or package and still further prevents the escape therefrom of any dust or other parts of the material to be packed. The presence of these layers of felt are very desirable in packing those materials which are very liable to produce dust—such as baking-powder and fine dry paints or drugs, &c. In packing articles less finely comminuted either the collar or the felt on the tube, or both, can be omitted.

The platform D is mounted on the stem $d$ immediately under the hopper-spout. The stem $d$ passes through the table T or other suitable support of the framework and iron plate T', and has attached to its lower end the belt E. The belt E passes over the pulley E' and bears at its other end the weights W. The lever F is fulcrumed in the iron plate T or equivalent support and is provided with the handle $f$ and below with the lug $f'$. The bearing-piece F' is adjustably attached to the lever F, so that it can be moved and set vertically at different points relatively to the bearing-piece $f^5$. A convenient means for this purpose consists of thumb-screw $f^2$, which passes through the slot $f^3$ in piece F', or a suitable hand-wheel and screw may be used in lieu thereof. The slot $f^3$ permits a vertical adjustment of the piece F'. Below the lever F the piece F' is provided with the shoulder $f^4$, against which the tappet $d'$ on the stem $d$ strikes as it descends.

A convenient mode of forming this shoulder consists in bending the piece F″ toward the stem $d$.

The spring G is preferably provided and attached, as shown, to cause the lever F to continually press in the proper direction.

The lever H is conveniently fulcrumed to the frame or to a cross-piece, as shown. It projects alongside the stem $d$ and is provided with the lateral tappet $h^2$, which rests on the lug $f'$ when the machine is in motion. The rod $h$ extends upward from the lever H and connects with the bent lever $h'$, that operates the clutch $a^5$. Instead of the platform D always carrying a single package I sometimes provide the package-holder L of a disk or other desired form. The holder L is rotatable and suitably supported. In the present illustrative instance it is centered upon a pin $j$, which latter is centered in a sector J or equivalent support, attached to the top of the stem $d$. It is provided with a number of spaces $l$ to hold empty packages, and in its rim the notches $l'$, corresponding in number to the spaces $l$, are cut. The spring-pawl M is attached to the sector J and bears against the edge of the disk L, its lug $m$ slipping into the notches $l'$, in this way holding the disk L in position.

The machine is intended for packing granular or powdered substances.

The mode of action of the device is as follows: The substance to be packed is placed in the hopper. An empty package is placed upon the platform D or a series of packages on the disk L and the stem $d$ raised by the weight W to the position shown in Fig. 2. In this position the package P surrounds the spout $a'$ with its top bearing against the collar C. As the auger fills the package the stem $d$ is forced downward, raising the weight W. This weight W is constructed of a number of removable rings or disks, as shown in Figs. 2 and 3 of the drawings, which may be removed from or added to said weight to diminish or increase it, and thereby secure the desired density of packing. The collar C descends with the package P, being forced down by the spring C′, and in this way keeps the top of the package covered and prevents the escape of its contents. When the package is filled, the tappet $d'$ reaches the shoulder $f^4$, which has been adjusted with this object in view, and, moving the lever F backwardly, draws the lug $f'$ from under the tappet $h^2$ and permits the lever H to drop. The dropping of the lever H throws the clutch $a^5$ out of gear and stops the machine.

When the filled package is removed and another put in its place either by being placed on the platform D or by revolving the disk L, the weight W is permitted to raise the platform D into the position shown in Fig. 2. As the stem $d$ rises the tappet $d'$ raises the lever H into the position shown in Fig. 2 and in dotted lines in Fig. 1, and the clutch being thrown in gear by this means the machine starts up.

When it is desired to stop the machine, the stem $d$ is drawn down either by hand or by the aid of the lever and connecting-rod shown in dotted lines in Fig. 2 until the tappet $d'$ catches under the bottom of the piece F″, as shown in Fig. 3.

To start the machine again, it only becomes necessary to move the handle $f$ slightly inward, which releases the tappet $d'$ from under the piece F′.

When desired, a foot-lever can be connected to the strap E, preferably beneath the weight W, and employed to enable the operator by the pressure of his foot to raise the package up to the tube $a'$, thereby enabling his hands to be otherwise employed.

The movable ring provided with felt and the presence of the felt at the bottom of the tube is designed especially for use in packing such substances as are very dusty, and the use of the tube and felt is to confine the dust from escaping into the room. Where the substance is not specially dusty, the ring with felt or the felt on the bottom of the tube, or both, may be dispensed with.

While the various features of my invention are preferably employed together, one or more of them may be used without the remainder, and in so far as applicable one or more of said features may be used in connection with packing devices or machines other than the one herein particularly described.

What I claim as new, and desire to secure by Letters Patent, is—

1. In a packing or filling machine, a tube, through which the material to be filled or packed passes, having around the outside of its lower end or mouth a ring or packing of felt or other soft pliable material, in combination with a movable ring having attached to its under side felt or other soft or pliable material, said ring fitting around the tube and sliding up and down on the same, and having a spring to press said ring down onto the top of the box or package to be filled, substantially as described.

2. In a packing or filling machine, a tube through which the material to be filled or packed passes, a ring surrounding the tube, through which the material passes, and movable thereon, the ring being provided with a padding of felt or other soft and pliable material fastened to the under part of said ring to fit down onto the top of the box to be packed, to prevent dust from escaping, and provided with a spring to press said padding down on the top of the box during the filling process, substantially as and for the purposes specified.

3. In a packing or filling machine, the combination of the following elements: a hopper and filling-tube, a packing-auger within the same driven by a shaft and connecting-gearing, a clutch for said shaft, a vertically-moving platform beneath said filling-tube, the lever F provided with a lug $f'$, and having adjustably secured thereto the bearing-piece F', the lever H, connected to the clutch by means of the link $h$ and bell-crank $h'$ and provided with a projection $h^2$ engaging the lug $f'$, the tappet $d'$, upon the lower end of the vertically-moving platform, and the weight W, for giving upward motion to said platform, whereby at the completion of the downstroke of the platform the lever F is shifted to disengage the lever H to throw the clutch out of engagement and thereby stop the machine, and whereby upon the completion of the upward stroke of the platform the tappet $d'$ engages the lever H and shifts the same to cause it to be reëngaged by the lever F and reëngage the clutch to start the machine, substantially as and for the purposes specified.

4. In a packing or filling machine, the combination of the lever F, provided with the adjustable extension F', and lug $f'$, the vertically-moving package-support, carried by the supporting-stem $d$, the pulley E', the strap E passed over said pulley and connected at one end to the lower end of the stem $d$ and provided at its opposite end with the weight W, the tappet $d'$ upon the lower end of the stem $d$ extending out so as to strike the lower end of the inwardly-projecting end $f^4$ of the lever, when the tappet $d'$ uplifts, and the clutch-shifting lever H, substantially as and for the purposes specified.

5. In a packing or filling machine, the combination of the tube $a'$, felt layer $a^3$ secured to the bottom of said tube, collar C surrounding said tube loosely and sliding thereon, and elastic means for pressing the collar toward the free end of said tube $a'$, felt layer $C^2$ located on the under side of the collar, hopper A connected to the tube $a'$ and fitting thereinto, substantially as and for the purposes specified.

6. In a packing or filling machine, the combination of the hopper A, delivery-tube $a'$ connected thereto, felt layer $a^3$ at the lower end and outer edge of tube $a'$, collar C loosely surrounding tube $a'$ and sliding thereon, felt layer $C^2$ secured to the under side of the collar, vertically-moving platform located oppositely to tube $a'$, stem $d$ supporting said platform, tappet $d'$ attached to said stem $d$, and tappet $h^2$ attached to lever H, strap E and pulley E' for strap E, weight W connected to said strap, and latching device consisting of the pivoted lever F, bearing-piece F' connected thereto, lug $f'$ located above bearing-piece F', substantially as and for the purposes specified.

7. In a filling or packing machine, the combination of the hopper A and delivery-tube $a'$ at the delivery end of said hopper, package-support beneath said tube and mounted upon the reciprocatory stem $d$, provided at its lower portion with the tappet $d'$ having a flat surface above and a latch beveled portion below, auger located within the hopper and rotated by appropriate gear driven by a suitable shaft containing a clutch, and a lever for directly operating said clutch, the lever H connected to said clutch substantially as described, a portion, viz: tappet $h^2$ of the lever being in the line of movement of the tappet $d'$ and provided with a flat side below and a beveled side above, and the pivoted lever F having the handle-piece and the lug $f'$ adapted to be moved outwardly by the beveled face of the tappet $h^2$ and to positively engage the under side of the tappet $h^2$, and the part F' of the lever F having the shoulder inclined downward and toward the stem $d$ for the purpose of enabling the tappet $d'$ to operate thereon in the descent of the latter and having a lower end abutment to positively engage with the upper side of the tappet $d'$ when the latter is fully depressed, substantially as and for the purposes specified.

8. In a filling or packing machine, the combination of the hopper A and delivery-tube $a'$ at the delivery end of said hopper, package-support beneath said tube and mounted upon the reciprocatory stem $d$, provided at its lower portion with the tappet $d'$ having a flat surface above and a latch beveled portion below, auger located within the hopper and rotated by appropriate gear driven by a suitable shaft containing a clutch, and a lever for directly operating said clutch, the lever H connected to said clutch substantially as described, a portion, viz: tappet $h^2$ of the lever being in the line of movement of the tappet $d'$ and provided with a flat side below and a beveled side above, and the pivoted lever F having the handle-piece and the lug $f'$ adapted to be moved outwardly by the beveled face of the tappet $h^2$ and to positively engage the under side of the tappet $h^2$, and the part F' of the lever F having the shoulder inclined downward and toward the stem $d$ for the purpose of enabling the tappet $d'$ to operate thereon in the descent of the latter and having a lower end abutment to positively engage with the upper side of the tappet $d'$ when the latter is fully depressed, portion F' being slotted and secured to the lever F by set-screw $f^2$ for enabling the part F' to be adjustable upon lever F, substantially as and for the purposes specified.

9. In a filling or packing machine, the combination of the hopper A, tube $a'$, platform, stem $d$, carrying tappet $d'$, lever H, clutch $a^5$, and mechanism for connecting same with said lever H for the purpose of starting and stopping the packing shaft or auger in the hopper, lever F carrying lug $f'$, and adapted to engage the tappet $h^2$ on lever H, and the bearing-piece F', adjustably secured to the lever F and provided with shoulder $f^4$, substantially as and for the purposes specified.

10. In a filling or packing machine, the combination of the hopper A and the spout or tube $a'$ connected to the delivery end of the hopper, collar C surrounding said tube and sliding loosely thereon, spring C' abutting against a projection above and collar C below for the purpose of elastically advancing the collar and a supporting device located oppositely to the collar C for holding the can or package to be filled, and a stem $d$ for upholding the supporting device, substantially as and for the purposes specified.

JOHN H. DAY.

Attest:
WM. E. JONES,
G. A. W. PAVER.